(12) United States Patent
Kavecky et al.

(10) Patent No.: US 10,755,821 B2
(45) Date of Patent: Aug. 25, 2020

(54) COMPOSITE FOR HEAT TRANSFER WITH HIGH-TEMPERATURE RESISTANCE

(71) Applicant: USTAV MATERIALOV A MECHANIKY STROJOV SAV, Bratislava (SK)

(72) Inventors: Stefan Kavecky, Bratislava (SK); Pavol Stefanik, Bratislava (SK); Karol Izdinsky, Bratislava (SK); Frantisek Simancik, Bratislava (SK)

(73) Assignee: USTAV MATERIALOV A Mechaniky Strojov SAV, Bratislava (SK)

( * ) Notice: Subject to any disclaimer, the term of this patent is extended or adjusted under 35 U.S.C. 154(b) by 121 days.

(21) Appl. No.: 16/066,804

(22) PCT Filed: Dec. 28, 2015

(86) PCT No.: PCT/IB2015/060017
§ 371 (c)(1),
(2) Date: Jun. 28, 2018

(87) PCT Pub. No.: WO2017/115105
PCT Pub. Date: Jul. 6, 2017

(65) Prior Publication Data
US 2019/0006050 A1    Jan. 3, 2019

(30) Foreign Application Priority Data
Dec. 28, 2015 (SK) .................. 50091-2015

(51) Int. Cl.
*B32B 3/00* (2006.01)
*G21B 1/13* (2006.01)
(Continued)

(52) U.S. Cl.
CPC .............. *G21B 1/13* (2013.01); *B32B 15/016* (2013.01); *B32B 15/043* (2013.01);
(Continued)

(58) Field of Classification Search
CPC .................................. B32B 15/01; G21B 1/13
See application file for complete search history.

(56) References Cited

U.S. PATENT DOCUMENTS

| 5,975,410 A | 11/1999 | Slattery |
| 2011/0049749 A1 | 3/2011 | Bailey |

FOREIGN PATENT DOCUMENTS

| CN | 102615416 | 8/2012 |
| CN | 103194712 | 7/2013 |

(Continued)

OTHER PUBLICATIONS

Slattery et al.: "Development of Tungsten Brush Structures for PEC Armour Applications", 17th IEEE/NPSS Symposium Fusion Engineering (Cat. No. 97CH36131). vol. 2 1998, pp. 888-891, XP002761975, USA DOI: 10.1109/FUSION.1997.687767 ISBN: 0-7803-4226-7 Retrieved from the Internet: URL:http://ieeexplore.ieee.org/stamp/stamp.jscp?tp=&arnumber=687767 [retrieved on Sep. 16, 2016] p. 888, paragraph 1—p. 889, last paragraph.

(Continued)

*Primary Examiner* — Elizabeth E Mulvaney
(74) *Attorney, Agent, or Firm* — Defillo & Associates, Inc.; Evelyn A. Defillo

(57) ABSTRACT

Composite for the transfer of the heat between the hot and cooled surface, whereby the composite is resistant to high temperatures, includes at least two components, one of the components is produced by longitudinal segments (1) with the melting temperature that is higher than 1300° C. and which are separated from each other by the filling (2) with the higher heat conductivity and thermal expansivity, which is in the direct contact with the cooling medium in the channel (3). Both components are in the direct contact with the hot environment surrounding the composite, whereby the overall surface formed by the segments (1) is 50 to 95% of the overall hot surface of the composite. The longitudinal (Continued)

axis of the segment (1) is primarily oriented in the direction of the shortest line connecting the hot surface with the cooled surface of the composite with the allowed deviation of 45° at maximum, whereby in the direction from the hot to the cooled surface it can cross one boundary between the components at maximum. The material for the segments can be tungsten, preferably tungsten with the admixtures of oxides $La_2O_3$ and/or $Y_2O_3$ and/or $CeO_2$ and/or $ThO_2$ and/or $ZrO_2$. The matrix, that is, the filling (2) can be copper or silver or their alloys.

20 Claims, 3 Drawing Sheets

(51) Int. Cl.
  *B62K 15/00* (2006.01)
  *B62K 17/00* (2006.01)
  *B32B 15/01* (2006.01)
  *B32B 15/04* (2006.01)
  *B32B 5/04* (2006.01)
(52) U.S. Cl.
  CPC ............ *B62K 15/006* (2013.01); *B62K 17/00* (2013.01); *B32B 5/04* (2013.01); *Y02E 30/128* (2013.01)

(56) References Cited

FOREIGN PATENT DOCUMENTS

| | | |
|---|---|---|
| CN | 103886919 A | 6/2014 |
| CN | 104446973 | 3/2015 |
| KR | 20120068116 | 6/2012 |

OTHER PUBLICATIONS

Drimeyer et al.: "Developement of direct HIP-bonding processes for tungsten-brush armor joining", 18th IEEE/NPSS Symposium on Fusion Engineering. Symposium proceedings (Cat. No. 99CF-137050), 1999, pp. 369-372, XP002761976, USA DOI: 10.1109/FUSION.1999.849858 ISBN: 0-7803-5829-5 Retrieved from the Internet: URL:http://ieeexplore.ieee.org/stamp/stamp.jsp?arnumber=849858 [retrieved on Sep. 16, 2016] p. 370, left-hand column, paragraph 2.

Cardella et al: "Design of the ITER EDA plasma facing components", Fusion Engineering and Design, Elsevier Sciences Publishers, Amsterdam, NL, vol. 39049, Sep. 1, 1998 (Sep. 1, 1998), pp. 377-384, XP004142940, ISSN: 0920-3796, DO: 10.1016/S0920-3796(98)00150-1 pp. 383, last paragraph—p. 384, paragraph 4.

COMPOSITE FOR HEAT TRANSFER WITH HIGH-TEMPERATURE RESISTANCE

CROSS REFERENCE TO RELATED APPLICATION

This application is a national stage entry of PCT/IB2015/060017 filed Dec. 28, 2015, under the International Convention claiming priority over Slovak Patent Application No. PP50091-2015 filed Dec. 28, 2015.

FIELD OF THE INVENTION

The invention concerns a composite which is able to endure high levels of heat flow in long term, whereby it is resistant to high temperatures, too. The invention discloses new structure (architecture) of the composite which maintains an effective heat dissipation from the surface of the composite—exposed to the high temperature—to the cooled part in such a way that the material is not damaged even in case of the repeated cyclical thermal stress and of the high temperature difference. The composite with the new structure resists the extreme heat load for example in the walls of thermal reactors, plasmatrons or electrodes producing the electric or plasma arcs.

PRIOR STATE OF THE ART

Devices with extremely hot environments are used in various industrial and research fields. In order for such device to operate in the long term, the heat has to be effectively transferred or dissipated from the extremely hot surfaces of the materials directly surrounding the given hot environment, so that these materials are not melted. The channels for the distribution of the liquid-based or gas-based cooling medium (for example water, steam, air, helium) located in certain distance from the hot surface in the same or in the directly adjacent material are used for this purpose. Considering the high differences in the temperature of the hot surface and the cooled surface of the channel the stresses arise in the material or materials, respectively; the level of the stress is directly proportional to the difference between the temperatures between surfaces, the coefficient of the thermal expansion of the material, the modulus of elasticity of the material, and the distance between the surfaces. If the level of the inner stress exceeds the yield strength or the material strength at the given temperature even only locally, the irreversible damage occurs. The difference in the temperatures between the hot and the cooled surface—that is, the outer surface of the material which is intended for the heat transmission from the environment to the material—and the layer of the material which is intended for the heat transfer, depends on the thermal conductivity of the material or materials, respectively, situated in the direction of the heat flow. The main problem is that the materials with high temperature of melting that are able to resist high temperatures (e.g. ceramic materials, graphite, alloys of the metals with high temperature of melting such as molybdenum, tungsten and so on) usually have low thermal conductivity, high modulus of elasticity, and it is difficult to produce the cooling channels within them in the vicinity of the hot surface, which in the operation leads to extremely high levels of thermal stresses and premature damage.

On the other hand, the materials with high temperature conductivity and lower modulus of elasticity such as copper, aluminum, silver and their alloys, have a lower temperature of melting and in the devices with the working temperature above 1200° C. they are basically worthless and unusable. Moreover, these materials have a high coefficient of thermal expansion, which combined with their relatively low strength leads to premature damages in case of large temperature gradients and cyclical stress.

Prior State of the Art Solves the Abovementioned Problems Following:

The cooling channels are produced in the material with the good thermal conductivity which is on the hot surface covered by the compact layer of the material with high temperature of melting, whose function is to diminish the extreme temperature to the level which can be endured by the "cooling" material. In this approach the dissipation of the heat is still limited by the low thermal conductivity of this layer, high stresses on the joint of two materials and high stresses in the layer depending on its thickness. In order to partially eliminate these stresses, a protective layer is sometimes incised in certain distances or pitches.

Using various methods of strengthening of the metals with high thermal conductivity (for example, a method of dispersedly distributed fine ceramic particles, of alloying or doping with subsequent thermal processing, of strengthening fibers, and so on) the strength of this metal increases at high temperature and resistance to extreme stresses. However, all these methods in principle diminish the thermal conductivity of the material in the direction of heat flow and do not solve the problem of the maximal temperature of the hot surface, which is still limited by the temperature of the melting of the basic matrix metal. In case of fibers of the strengthened materials it is possible to achieve some desired features by one part of the composite and other features by the other. For example, the composite tungsten-copper is known, disclosed in several patent publications, for example, CN103194712 A, KR20120068116 A, CN104416973 A. Tungsten has a higher temperature of melting, while the copper has a significantly higher thermal conductivity and lower modulus of elasticity.

The publication CN102615416 discloses a module for the fusion reactor which is produced by the powder metallurgy at very high pressure. One part of CuCrZr and four parts of tungsten are the basis for the relatively difficult and protracted method of production of the module.

The composite tungsten-copper according to US2004195296 A1 for the use in the fusion reactor has a laminated structure. There are high shear stresses between the layers, which are produced by the different thermal expansion and different temperatures in the individual layers.

The known solutions do not ensure the long lifespan of the composite because they do not solve the basic problem of the different expansion of the hot surface and surface of the cooling channel, which leads to high inner stresses and premature damage during cyclical stresses, especially when the difference between the temperature of the surfaces is high and the distance of the cooling channel from the hot surface is small.

Such solution is therefore desired and not known which would ensure the long lifespan, security and reliability at the high thermal conductivity and high thermal flow.

SUMMARY OF THE INVENTION

The abovementioned deficiencies are significantly remedied by the composite for the conduct of the heat with the high temperature resistance according to claims 1 to 20. New architecture of the composite according to this invention lies in the fact that the composite is produced by at least two components, one of which has a temperature of melting higher than 1300° C. (hereinafter "HT component", where "HT" denotes "high temperature") and the other (hereinafter "HC component", where "HC" denotes "high conductivity") has a temperature of the melting that is lower than that of the former and, at the same time, the HC component has a thermal conductivity and expansivity that are higher than that of the HT component. The former HT component is made of longitudinal segments which are separated from each other by the latter HC component. The composite is oriented in such a way that it has an outer side intended for the transfer of the heat from the environment to the matter of the composite; the outer side is a hot side, that is, it is a side exposed to the influence of the high temperature. Both components—HT and HC—lead to the outer side, that is, to the hot side and they are in the direct, immediate contact with the hot environment around the composite. Each longitudinal segment in the composite runs to the hot side, where it is a part of the hot side which is surrounded by the hot environment. The composite has a layer designed for the heat transmission, preferably for the transmission of the heat into the cooling medium. This layer can be set by the cooling channel which is produced in the composite. The material constituting the cooling channel can be composed from the HC component only; it is, however, possible that the longitudinal segments of the HT segment reach the surface of the channel, too. The longitudinal segments are placed in the composite in such a way that their ends are on the one end led to the hot surface and the other ends they are led inside the composite. The part of the longitudinal segment—usually the front of the longitudinal segment—forms a part of the outer surface of the side which is surrounded by the hot environment. The other part of the longitudinal segment is placed or embedded in the filling; it basically leads towards the cooled layer of the composite.

The heat flow leads from the outer side, where the heat enters into the matter of the composite from the environment; the heat runs through both components of the composite to the layer which transfers the heat out of the matter of the composite, usually by means of the cooling medium.

The surface of one longitudinal segment of the HT component which is in immediate contact with the hot environment surrounding the composite cannot be larger than 50 mm$^2$; preferably it should be smaller than 10 mm$^2$ and the total surface formed by the longitudinal segments of the HT component in the immediate contact with the hot outer environment of the composite must form at least 50% of the overall hot surface of the composite, preferably at least 75%. The length of the longitudinal segment of the HT component must be at least twice the length of the line which can be inserted into the cross-section of the longitudinal segment in the plane of the hot surface of the composite. The length of the longitudinal segments is at least twice the largest dimension in the cross-section of the segment in the plane of the outer side.

The longitudinal axis of the longitudinal segment is primarily oriented in the direction of the shortest line connecting the intersection of the longitudinal axis of the longitudinal segment and the hot surface of the composite with the surface of the cooling channel of the composite. The deviation from this direction can be 45° at maximum. In this arrangement the longitudinal segments are oriented in the direction of the conduct of the heat from the outer side to the layer for the transmission of the heat; they may deviate from this direction in 45° at maximum.

The disclosed geometry of the longitudinal segments leads to an advantageous arrangement where the longitudinal axis of the longitudinal segment in the direction from the intersection with the hot surface of the composite towards the cooled surface of the cannel can intersect a single boundary of the HC component at maximum. Thanks to this, the conduct of the heat in the matter of the composite is not further complicated by the multiple transitions through the boundaries of the two components.

The important feature of the invention is the use of the components of at least two components of at least two materials with the significantly different physical-chemical characteristics, whereby these components are distributed in the layer of the composite in such a way that the material with the better conductivity (HC component) connects directly the hot surface of the composite with the surface of the cooling channel which secures the high level of heat dissipation and thereby secures the significant decrease of the difference in the thermal expansivity of these surfaces, thereby reducing the said gap. On the other hand the high surface share of the material with the high temperature of melting (HT component) in the hot surface of the composite protects this surface from melting.

The small cross-section of individual longitudinal segments of the HT component, which has a smaller heat expansivity than the HC component, on the hot surface of the composite significantly limits the possibility of the arising of cracks at the boundary as result of the differences in the heat expansivity between the individual components.

The ratio of the HT component to HC component can diminish in the direction going from the hot surface to the surface of the cooling channel, which naturally balances the thermal expansivity in the layer between both surfaces, because the cooler surface will have a higher coefficient of the thermal expansiveness than hot. In order to diminish the share of the former component in the individual layers of the composite such structure can be used in which longitudinal segments of different length are placed, whereby it still holds that these longitudinal segments lead onto the hot outer side and therefore they have their ends stricken on the outer side. The other ends of the longitudinal segments reach various depths of various layers in such a way that in the individual layers one reaches a desired ratio of the HT and HC component. In this way one compensates the different thermal expansiveness caused by the different temperatures in the layers of the composite.

If in the layers of the composite numbered 1, 2, 3, and 4 the temperatures are $T_1 > T_2 > T_3 > T_4$ and the thermal expansiveness is $CTE_1 < CTE_2 < CTE_3 < CTE_4$, we can in individual layers reach identical overall prolongation in the plane that is perpendicular to the heat flow ($\Delta L_1 \approx \Delta L_2 \approx \Delta L_3 \leq \Delta L_4$). Such state (FIGS. 5 to 9) diminishes the deformation stresses. It is preferable if the distribution of the shorter and longer longitudinal segments is even, which can be achieved by repeated alteration of the gradually changing lengths of the segments in the transverse directions of the composite.

The HT component should have an extremely high temperature of melting. The particular value can depend on the given technical application which can be higher than 1300° C., preferably higher than 2000° C., especially preferably higher than 3000° C. An example of such material is tungsten which melts at 3421.85° C. The HT component in the composite increases the heat resistance; it is therefore important that it is not melted during given technical application. HT component usually has a lower heat conductivity, lower coefficient of the thermal expansivity and it is stronger and firmer.

The significant feature of the invention is the existence of the longitudinal segments of the HT component, which are oriented in the direction of the heat flow and which are separated from each other by the HC component, which has higher heat conductivity. The longitudinal segments have length which in preferable arrangement is five times their width, preferably ten times their width; this is their main shape character, too.

The longitudinal segments will usually be of a macroscopic nature; they will be perceivable by a naked eye in the structure of the composite. The length of the longitudinal segment will roughly correspond to the width of the layer between the cooling channel and the surface where the heat is transferred. Considering the different temperature on the both surfaces, these surfaces are potentially exposed to different heat expansion, which can be advantageously eliminated by the increasing coefficient of the thermal expansivity towards the cooler surface by means of increasing the share of the HC component at the expense of the HT component by means of appropriate shortening of the length of some longitudinal segments of the HT component. HC component in the composite fills in the space between the longitudinal segments of the HT component. It is preferable if the HC component has a good adhesion to the HT component as well as excellent heat conductivity. The lower strength and good plasticity of the HC component helps to diminish the level of the interior stresses on the boundary between the components. The good example of the appropriate material is copper. If we compare those chemical-physical characteristics of the tungsten and copper which are relevant for the high-temperature applications.

|  | unit | Tungsten | Copper |
| --- | --- | --- | --- |
| temperature of melting | °C. | 3 421,85 | 1 084,62 |
| thermal conductivity | $W \cdot m^{-1} \cdot K^{-1}$ | 173 | 401 |
| thermal expansivity | $\mu m \cdot m^{-1} \cdot K^{-1}$ | 4.5 | 16.5 |
| Young's modulus | GPa | 411 | 110 |
| electric resistance | $n\Omega \cdot m$ | 52.8 | 16.78 | we see that the individual features differ and that the differences in absolute values are at least in the order of doubles. The proposed invention makes very good use of them; according to the invention the composition of the composite will in the preferable arrangement include tungsten and copper or tungsten and silver; other combinations of other materials are possible, too.

Tungsten has high firmness, strength, solidity and resistance to the electric spark as well as spark erosion. Aside from the pure tungsten, the tungsten with the addition of the rare mixtures—for example, oxides $La_2O_3$, $Y_2O_3$, $CeO_2$, $ThO_2$ or $ZrO_2$—can be used as HT component. These mixtures improve the mechanical features of the tungsten in the oxidation and also in the inert atmosphere; during the use of plasmatrons they simplify the burning and the stability of the circuit. The mixtures also lower the fragility of the tungsten at low temperatures (ductile-to-brittle transition temperature DBTT 400-650° C.).

The longitudinal segments in the composite are intentionally placed in the oriented way; therefore these are not randomly oriented particles as known in the prior state of the art in case of the powder sintered composite. The longitudinal segments are placed mutually adjacently, which means that they are placed by each other and separated by the HC component, whereby they can also touch each other but they cannot be diffusely connected without the boundary with the HC component. They are oriented mutually in parallel, which, however, does not exclude certain angular technological irregularities.

The longitudinal segments are usually shaped as rods, pegs, pins, wires, fibers, and so on. The longitudinal segments have usually identical cross-section—for example, circular cross-section—within the structure of the composite. The cross-section of the longitudinal segments can be elliptical, star-like, rectangular or polygonal, preferably hexagonal. The longitudinal segments within a single composite can have identical cross-section and size, but they can also differ in cross-section and/or size. The cross-section of the longitudinal segment can be constant through its whole length, or it can be different. A longitudinal segment can have a waist with the circular cross-section and at the same time it can be ended by hexagonal head on the hot side.

It will be preferable if the longitudinal segments are produced by rolling or stretching, which brings with itself—besides the high productivity—good mechanical features mainly in the direction of longitudinal axis of the segment without internal faults. The longitudinal segments can be produced by the division (or cutting) of the longer rods, wires, electrodes, and so on.

The fact that the longitudinal segments are oriented in the direction of the main heat flow—or deviate from this direction in the angle ranging from 0° to 45°—expresses the most advantageous orientation of the longitudinal segments in the composite. The "main heat flow" is a heat flow which is primarily invoked by the difference of the temperatures between the surface/layer in the direction from the place with the extremely high temperature and the cooled layer, mainly the cooling channel. Pursuant to particular distribution and size of the channel the heat flow can be variously deformed. The varying geometry of the construction—or production irregularities—can cause the temperature gradient to be irregular in certain zones, but the main heat flow and the direction of this flow will not be significantly affected by this. The vector of the heat flow on the hot side of the composite will be usually in parallel with the orientation of the longitudinal segments.

The HC component fills in the space between the longitudinal segments; it creates a plastic metal filling which produces a matrix or a grid carrying the longitudinal segments. These enter directly onto the surface on the hot side, or they can overhang or protrude from this surface, respectively. If the filling of the HC component is aligned with fronts of the longitudinal segments an erosion, a surface melting, or an evaporation can occur during high energetic stress; this creates a small crater in the given place and the longitudinal segments will protrude or overhang slightly from the surface (FIG. 4). Such process and state is not problematic; what is important is that in the course of time the erosion of the HC component naturally stops, because the protruding HT component starts to effectively shield (or shade) the HC component. The HC component will nonetheless remain in direct contact with the outer hot environment surrounding the composite. In some applications the presence of the HC component with the lower temperature of melting in the same plane on the surface with HT component is undesired, and therefore the process of preparation of the composite is realized in such a way that the longitudinal segments protrude from the surface of the composite (in 1-2 mm at maximum) already from the beginning. In another arrangement the HC component can during the production intentionally interfere in the level of the fronts of the longitudinal segments, whereby during the operation at high temperatures the HC segment starts to evaporate, which creates the ablative cooling of the longitudinal segments (heat of vaporization of, for example, the copper is 4800 kJ/kg).

The HC component in the preferable arrangement can be copper, silver or their alloys. Compared to tungsten, the silver has following chemical-physical features:

|  | unit | Tungsten | Silver |
|---|---|---|---|
| temperature of melting | °C. | 3 421,85 | 961,78 |
| thermal conductivity | $W \cdot m^{-1} \cdot K^{-1}$ | 173 | 429 |
| thermal expansivity | $\mu m \cdot m^{-1} \cdot K^{-1}$ | 4.5 | 18.9 |
| Young's modulus | GPa | 411 | 83 |
| electric resistance | $n\Omega \cdot m$ | 52.8 | 15.87 |

HC component will form 5 to 50% of the overall volume of the composite. It is important to secure regular and complete filling of the gaps between the longitudinal segments. A method to achieve this can be used where the HC component is regularly applied onto the surface of the longitudinal segments already before their insertion to the structure, that is, before their arrangement side by side. The semifinished product for the creation of the longitudinal segments in form of a wire can be—for example—galvanically covered by the layer of the latter material. The monolayers can be applied in the vacuum, in the protective atmosphere, without the use of the pressure, or with the use of the pressure. Technologies of the plasma spraying of the HC component, application of foils, and so on, can be used. The monolayer can be applied before the division (or cutting) of the semi-finished product into individual longitudinal segments.

In order to achieve high overall thermal conductivity, the composite is arranged in such a way that the heat is led through the route with maximally one transition through the boundary layer created by the boundary of the two components of the composite. In order to achieve high thermal conductivity it is necessary that the heat from the first HT component is well led to the HC component. This boundary does not need to be diffuse or metallurgically welded—a mechanical contact suffices. The longitudinal segments can be preferably covered by the coating which increase the quality of the heat transfer between the components.

The advantage of the composite with the structure according to this invention is its high resistance, the ability to safely and continually transfer high amount of heat energy at the high temperature gradient. The structure can be produced relatively simply with the usage of the available semi finished products and technologies and it is resistant to the electric erosion. High resistance at high temperatures is correlated with the achievement of high security and operational limits, which significantly surpass hitherto known technical solutions.

Composite according to this invention can be produced by the infiltration of the melted metal or melted metal alloy (other component) in the vacuum or inert atmosphere. It can be an infiltration with or without the application of pressure onto the melt. During the production of the composite the pressing of the mono-layers in vacuum or inert atmosphere at temperatures that are lower than the temperature of melting of the metal or metal alloy can be used, too. The mono-layers can be produced by galvanic covering of the layer of the other component or by plasma spraying, alternatively in combination with the use of the foil of the other component.

Composite with the architecture according to this invention can be preferably used in the plasmatrons—in the devices which produce high-energy plasma. These devices use electric arc initiated between the electrodes in order to produce plasma; they ionize the plasma producing medium (air, water steam, Ar, and so on). The flow of plasma with the temperature of several thousand Celsius degrees can be subsequently used for the cutting of the materials—for example, decomposition of the biomass, processing of the waste (including dangerous waste), disintegration of the minerals during contactless deep drilling, etc. During such application of the composite according to this invention a fact that the composite electrode is resistant to the simultaneous influence of the electric erosion, high temperature and corrosive environment, is taken advantage of.

The composites with the structure according to this invention can be largely used in the mechanical engineering, energetics, electrotechnics, and so on. Typical applications include high-, middle- and low-voltage circuit breakers, electrodes for resistant welding, as well as the materials of electrodes for EDM devices and materials for the dissipation of the heat from the high-temperature reactors or energetic and electronic devices.

BRIEF DESCRIPTION OF DRAWINGS

The invention is further disclosed by the FIGS. 1 to 9. The used scale of the longitudinal segments and the thickness of the layer of the composite as well as of the other parts of the structure is not binding; it is informative or directly adjusted for the purposes of clarity. Particular geometrical arrangement of the longitudinal segments is illustrative, too.

FIG. 5 is a side view on the longitudinal segments which have a different length, but which all reach the outer surface. Signs T1 to T4 denote the layers—planes with different temperatures;

FIG. 6 shows a cross-sectional views of the composite in the layer T1;

FIG. 7 shows a cross-sectional views of the composite in the layer T2;

FIG. 8 shows a cross-sectional views of the composite in the layer T3; and

FIG. 9 shows a cross-sectional views of the composite in the layer T4, only the other (latter) component in the whole cross-section without the longitudinal segments.

EXAMPLES OF REALIZATION

Example 1

Figure 1:
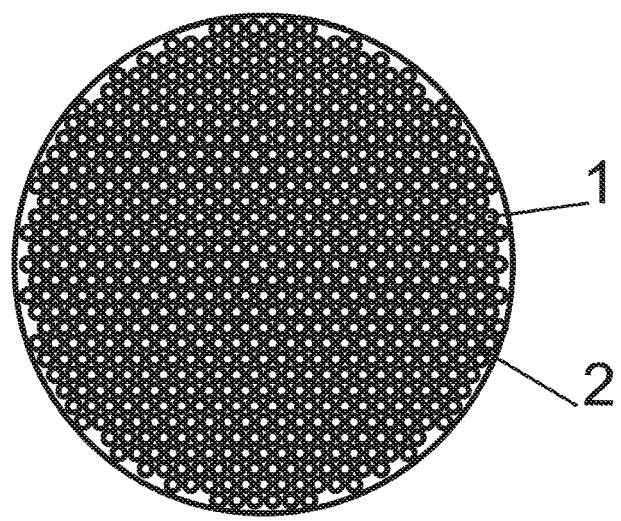
FIG. 1 is a cross-section of the circle electrode from the composite with the structure tungsten-copper.
Figure 2:
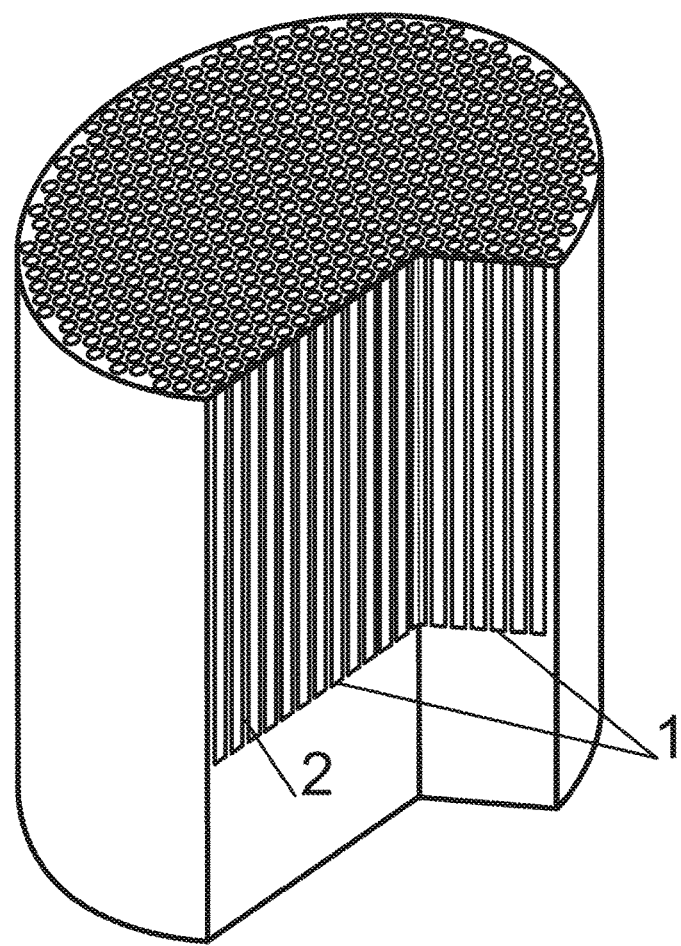
FIG. 2 is a spatial view of the cross-section of the circular electrode with the longitudinal segments placed in parallel.
Figure 3:
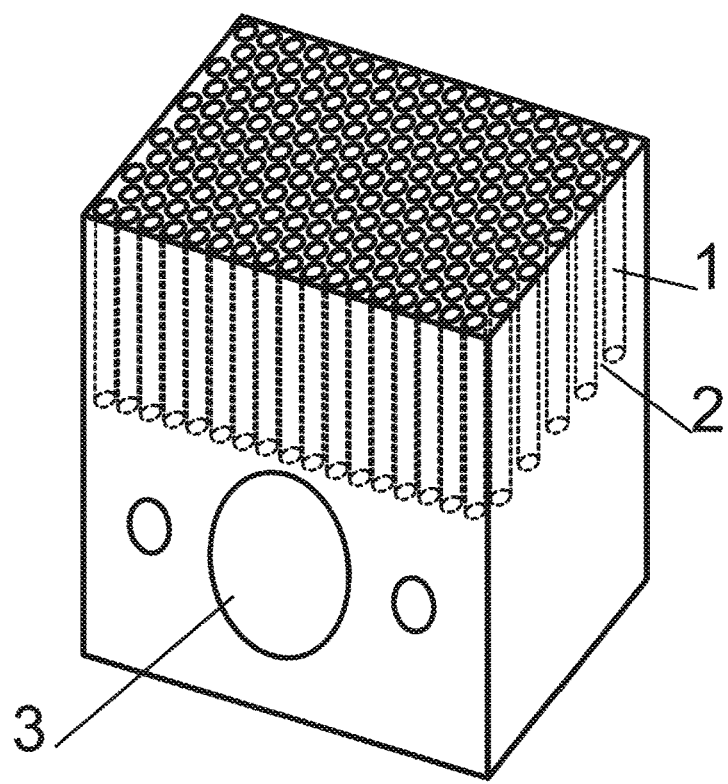
FIG. 3 is an axonometric view of the block of the composite with the cooling channel. The longitudinal segments in the first viewed layer are denoted by the dashed line.
Figure 4:
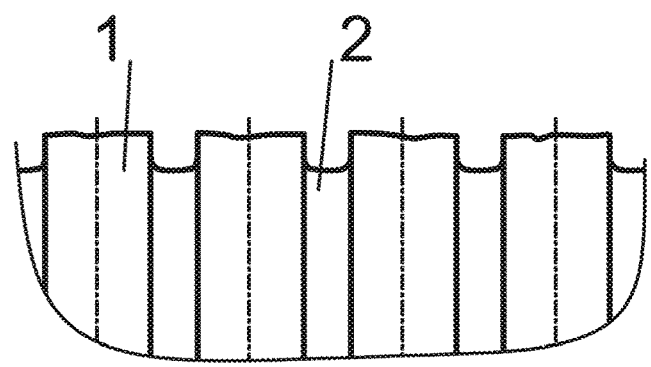
FIG. 4 is a detail of the surface where the repeated evaporation of the other component—forming a filling between the longitudinal segments—is depicted.
Figure 5:
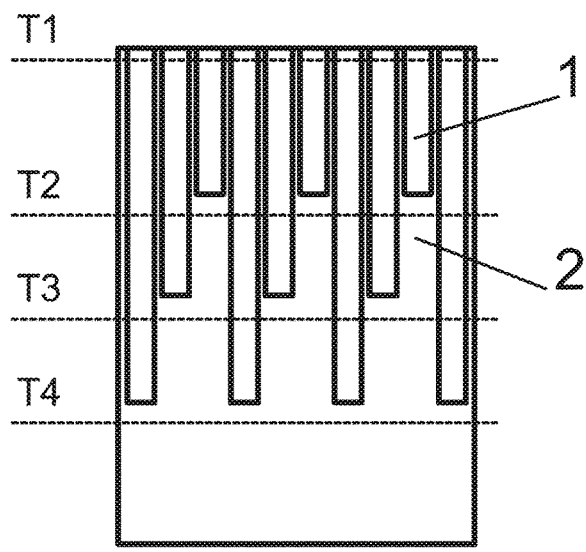
FIGS. 5 to 9 disclose the control of the thermal expansivity in the respective layers of the composite in the direction of the heat flow. The change in the thermal expansion is set by the ratio of the both components, which is achieved by the change in the lengths of the longitudinal segments.
Figure 6:
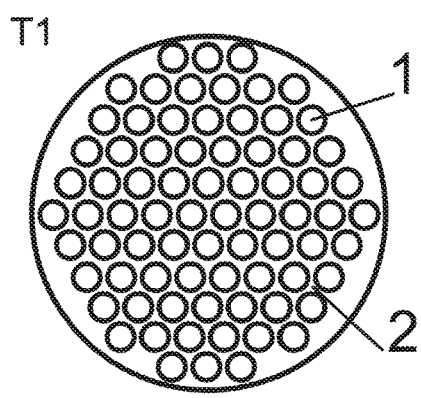
Figure 7:
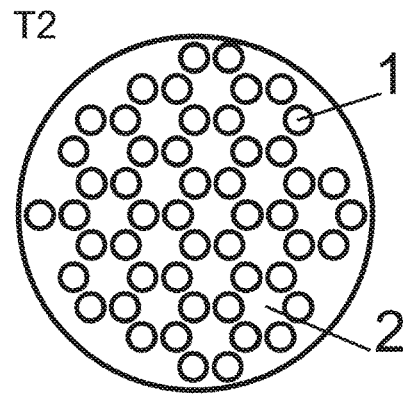
Figure 8:
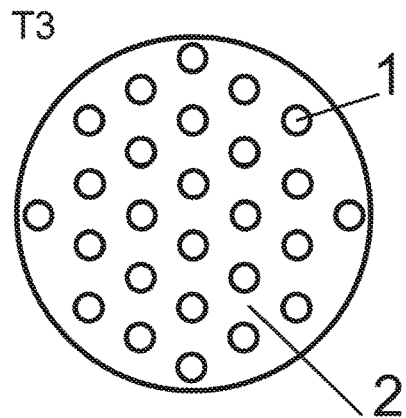
Figure 9:
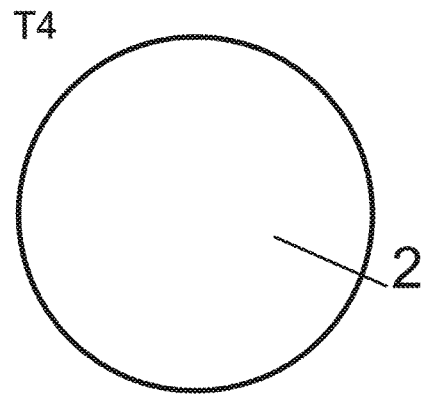

Composite according to this example on the FIGS. 1 and 2 is a part of the electrode of the cylindrical shape with the diameter 33 mm. The longitudinal segments 1 are from tungsten containing 2.0% $La_2O_3$. The semifinished product are rods with the diameter 1.6 mm, which are firstly coppered in the common coppering galvanic sulfate solution, which produces a copper layer with the thickness of 0.4 mm. The rods are then cut to desired lengths ranging from 15 to 22 mm and they are fixated onto the bottom of the mould in such a way that they do not move during isostatic pressing at 100 MPa and temperature of 900° C. The galvanically applied copper is a filling 2 of the composite. At the same time, the set of the longitudinal segments 1 is connected with the roll (or cylinder) of copper during the pressing, whereby the channel 3 for the cooling of the electrode is produced in this roll. Such produced electrode is used as a cathode in the plasmatron used for disintegration of the minerals, whereby it has at least three times longer lifespan than hitherto known materials used for the production of electrodes and devices produced of said materials.

Example 2

The longitudinal segments 1 in the shapes of rods from tungsten containing 2.0% $Ce_2O_3$ and of the diameter 2.4 mm, whose length ranges from 5 to 22 mm, are placed in parallel into the graphite mould in such a way that they are prevented from movement during the infiltration of the melted Cu in the vacuum at temperature of 1200° C. The different length of the longitudinal segments 1, their advantageous arrangement (mainly orientation of the axes perpendicularly onto the surface exposed to radiation and high temperature), and the symmetrical directioning against the cooling channel in the composite, ensure the increase in its resistance against the extreme burden of the various types of radiation. Compared to other tested materials (cyclical tests at heat radiation 20 $MW/m^2$) for the application in the diverter of the test fusion reactor, a sample with dimensions 20×20×30 mm such prepared with the composite according to this invention has been the only sample that endured the tests without significant damage. Compared to used conception of the diverter with W monoblocks according to the patent Plansee U.S. Pat. No. 6,565,988 (Ploechl Laurenz), the sample according to this invention has the 20% longer lifespan.

Example 3

A wire from the pure tungsten with the diameter 1 mm is wound onto the cylinder in a single layer in such a way that the distance between the windings of the wire is 0.1 mm. The CuCrZr layer from the powder of the diameter 38 μm is applied onto the wire in such thickness that the volume share of the tungsten in the composite is 60%. The composite is prepared by pressing in the isostate at 100 MPa pressure and temperature of 900° C.

Example 4

Rods with the diameter 3.2 mm from tungsten containing 1% of $La_2O_3$ are arranged in such a way that between two rods forming the longitudinal segments 1 there is one layer of cloth from the tungsten wires. The space between the tungsten components is filled in with the CuAgZr alloy by means of pressure infiltration at the temperature 1200° C.

Example 5

Composite according to example 1 is cut into the 10 mm thick plates and it is soldered by the Cu-3Si-2I-2.25Ti (Copper ABA) solder onto the cylinder (or roll) of the copper in such a way that the axes of the longitudinal segments 1 run in parallel with the axis of the copper cylinder. Such produced electrode has been used as a cathode in the plasmatron.

Example 6

Composite according to example 4 is cut into the 15 mm thick plates and the filling 2 on one surface has been etched off in the galvanic solution, but only to such depth that the longitudinal segments 1 remain fixated in the filling 2. The plates of such adjusted composite has been soldered on their non-etched surface to the block of CuCrZr alloy by means of Cu-10Mn-3Co solder, whereby the channels 3 are present in the block in such a way that the axes of the longitudinal segments 1 are basically perpendicular to the soldered plane. Such produced elements can be connected into the blocks and used in the walls of the heat reactor

INDUSTRIAL APPLICABILITY

The industrial applicability is obvious. According to this invention it is possible to repeatedly produce and use a composite for the effective transfer (or dissipation) of the heat in many technological applications, whereby its advantageous architecture ensures a long-term structural stability even at repeated cyclical stress at high temperature differences.

LIST OF RELATED SYMBOLS

1—longitudinal segment
2—filling
3—cooling channel

The invention claimed is:

1. A composite for a heat transfer with a high-temperature resistance, which is created by at least a first component and a second component, where the first component has a temperature of melting higher than 1300° C.,
   the second component has the temperature of melting that is lower than that of the first component,
   the second component has a heat conductivity and a heat expansivity that is higher than that of the first component,
   whereby the composite has an outer side intended for a transmission of the heat from an environment to a matter of the component and has a layer intended for the transfer of the heat to a cooling medium,
   wherein
   the first component is formed by a set of oriented longitudinal segments (1), the longitudinal segments (1) are oriented in a direction of the transfer of the heat from the outer side towards the layer for the heat transmission or deviated from a direction in 45° at maximum, respectively,
   a length of the longitudinal segments (1) is at least twice the largest dimension in a transverse cross-section of the longitudinal segment (1) in a plane of the outer side,
   wherein:
   the second component is formed by a filling (2) between the longitudinal segments (1),
   the first and the second components lead onto a surface of the outer side where the longitudinal segments (1), by their externally accessible surface, form at least 50% of the outer side intended for the heat transmission from the environment to the matter of the composite, and
   a surface of a single longitudinal segment (1) externally accessible on the outer side intended for the heat transmission from the environment to the matter of the composite is less than 50 mm$^2$.

2. A composite for a heat transfer with a high-temperature resistance, which is created by at least a first component and a second component,
where the first component has a temperature of melting higher than 1300° C.,
the second component has the temperature of melting that is lower than that of the first component,
the second component has a heat conductivity and a heat expansivity that is higher than that of the first component,
whereby the composite has an outer side intended for a transmission of the heat from an environment to a matter of the component and has a layer intended for the transfer of the heat to a cooling medium,
wherein
the first component is formed by a set of oriented longitudinal segments (1), the longitudinal segments (1) are oriented in a direction of the transfer of the heat from the outer side towards the layer for the heat transmission or deviated from a direction in 45° at maximum, respectively,
a length of the longitudinal segments (1) is at least twice the largest dimension in a transverse cross-section of the longitudinal segment (1) in a plane of the outer side,
wherein:
the second component is formed by a filling (2) between the longitudinal segments (1),
the first and the second components lead onto a surface of the outer side where the longitudinal segments (1), by their externally accessible surface, form at least 50% of the outer side intended for the heat transmission from the environment to the matter of the composite,
a surface of a single longitudinal segment (1) externally accessible on the outer side intended for the heat transmission from the environment to the matter of the composite is less than 50 mm$^2$; and
wherein the longitudinal segments (1) have a coating for an improvement of the heat transmission to the second component.

3. The composite for the heat transfer with the high-temperature resistance according to claim 1, wherein the longitudinal segments (1) have a tight mechanical contact with the filling (2) or they are diffusely or metallurgically connected.

4. The composite for the heat transfer with the high-temperature resistance according to claim 1, wherein the first component has the heat conductivity at least 50 W$^{.m-1.K-1}$ and the temperature of melting that is higher than 2000° C., preferably higher than 3000° C.

5. The composite for the heat transfer with the high-temperature resistance according to claim 1, wherein the heat conductivity of the second component is at least 50% more than the heat conductivity of the first component.

6. The composite for the heat transfer with the high-temperature resistance according to claim 1, wherein a material of the first component is a tungsten or tungsten with admixtures of oxides $La_2O_3$ and/or $Y_2O_3$ and/or $CeO_2$ and/or $ThO_2$ and/or $ZrO_2$.

7. The composite for the heat transfer with the high-temperature resistance according to claim 1, wherein a material of the second component is a copper or copper alloy.

8. The composite for the heat transfer with the high-temperature resistance according claim 1, wherein the material of the second component is a silver or silver alloy.

9. The composite for the heat transfer with the high-temperature resistance according claim 1, wherein an overall surface formed by the longitudinal segments (1) in a direct contact with the hot environment on the outer side ranges from at least 50% to 95% of an overall surface of the outer side.

10. The composite for the heat transfer with the high-temperature resistance according to claim 1, wherein the longitudinal segment (1) is at least 3 mm long and has a circular or rectangular or polygonal cross-section with a surface that is less than 30 m"2, preferably less than 10 m"2.

11. The composite for the heat transfer with the high-temperature resistance according to claim 1, wherein the longitudinal segment (1) has a longitudinally changing cross-section.

12. A composite for a heat transfer with a high-temperature resistance, which is created by at least a first component and a second component, where the first component has a temperature of melting higher than 1300° C.,
the second component has the temperature of melting that is lower than that of the first component,
the second component has a heat conductivity and a heat expansivity that is higher than that of the first component,
whereby the composite has an outer side intended for a transmission of the heat from an environment to a matter of the component and has a layer intended for the transfer of the heat to a cooling medium,
wherein
the first component is formed by a set of oriented longitudinal segments (1), the longitudinal segments (1) are oriented in a direction of the transfer of the heat from the outer side towards the layer for the heat transmission or deviated from a direction in 45° at maximum, respectively,
a length of the longitudinal segments (1) is at least twice the largest dimension in a transverse cross-section of the longitudinal segment (1) in a plane of the outer side,
wherein:
the second component is formed by a filling (2) between the longitudinal segments (1),
the first and the second components lead onto a surface of the outer side where the longitudinal segments (1), by their externally accessible surface, form at least 50% of the outer side intended for the heat transmission from the environment to the matter of the composite,
a surface of a single longitudinal segment (1) externally accessible on the outer side intended for the heat transmission from the environment to the matter of the composite is less than 50 mm$^2$; and
wherein the longitudinal segments (1) differ in length, whereby a share of the first component in relation to the second component diminishes in the individual layers in the direction towards the layer for the transmission of the heat outside of the composite.

13. The composite for the heat transfer with the high-temperature resistance according to claim 12, wherein the different longitudinal segments are distributed evenly in a cross-section of the composite or are distributed repeatedly after each other according to their length.

14. The composite for the heat transfer with the high-temperature resistance according to claim 12, wherein the lengths of the longitudinal segments (1) are set in order to balance the thermal expansivity in individual planes with the different temperature.

15. The composite for the heat transfer with the high-temperature resistance according to claim 1, wherein the longitudinal segment (1) is produced from a rolled or a stretched semi finished product.

16. The composite for the heat transfer with the high-temperature resistance according to claim 1, wherein the longitudinal segments (1) protrude from the surface of the filling (2) on the outer side less than 3 mm.

17. The composite for the heat transfer with the high-temperature resistance according to claim 1, wherein it is a part of an electrode or an electrode in a plasmatron.

18. The composite for the heat transfer with the high-temperature resistance according to any-claim 1, wherein the composite forms a surface of a wall of a high-temperature reactor or a surface of a diverter in a fusion reactor.

19. The composite for the heat transfer with the high-temperature resistance according to claim 1, wherein the composite has at least one cooling channel (3).

20. The composite for the heat transfer with the high-temperature resistance according to claim 19, wherein the cooling channel (3) is formed by the second component only.

* * * * *